F. DIEHL.
DRIVE WHEEL.
APPLICATION FILED JULY 26, 1916.
1,253,795. Patented Jan. 15, 1918.
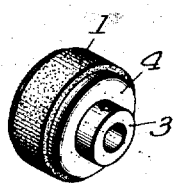
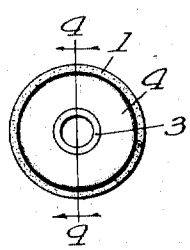
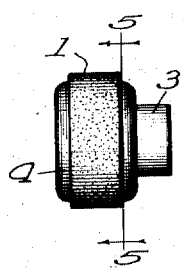
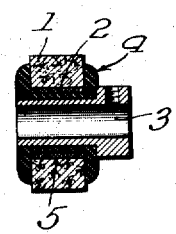
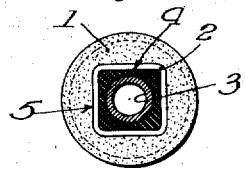
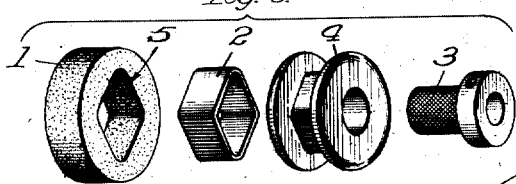
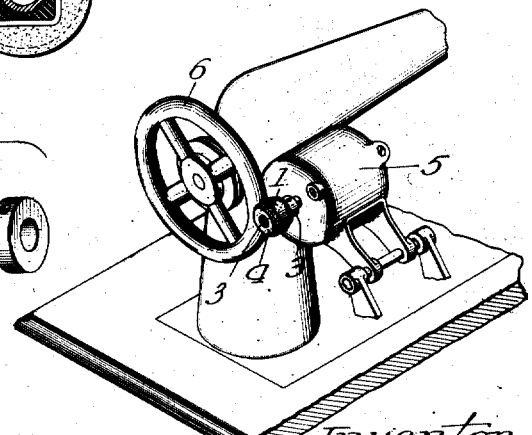
Witnesses:
Inventor
Frederick Diehl
Edwin B. H. Power Jr. Atty.

UNITED STATES PATENT OFFICE.

FREDERICK DIEHL, OF ELIZABETH, NEW JERSEY, ASSIGNOR TO DIEHL MANUFACTURING CO., OF ELIZABETH, NEW JERSEY, A CORPORATION OF NEW JERSEY.

DRIVE-WHEEL.

1,253,795.　　Specification of Letters Patent.　　Patented Jan. 15, 1918.

Application filed July 26, 1916. Serial No. 111,484.

*To all whom it may concern:*

Be it known that I, FREDERICK DIEHL, a citizen of the United States, residing at Elizabeth, in the county of Union and State of New Jersey, have invented new and useful Improvements in Drive-Wheels, of which the following is a specification.

This invention relates to drive wheels.

It relates particularly to friction driving wheels used on electric motors for driving sewing machines, but it is to be understood that its application is not limited to this use.

One of the objects of the invention is to provide an improved driving wheel which may be readily and inexpensively manufactured.

Another object is to provide an improved driving wheel which has a friction driving rim and a body of molded material.

A further object is to provide a wheel of improved construction that will be substantially noiseless.

Other objects and advantages will hereinafter appear.

An embodiment of the invention is shown in the accompanying drawings. The views of the drawings are as follows:

Figure 1 is a perspective view of a complete wheel embodying the invention.

Fig. 2 is an end elevation thereof.

Fig. 3 is a side elevation thereof.

Fig. 4 is a cross section view taken on the line 4—4 of Fig. 2.

Fig. 5 is a cross section view taken on the line 5—5 of Fig. 3.

Fig. 6 is a separated perspective view of several of the elements comprising the wheel.

Fig. 7 is a view showing the wheel as used with an electric motor for driving a sewing machine.

The wheel comprises, in general, a friction driving element 1 of cork or the like, a metal sleeve 2, a metal bushing 3 and a body of molded insulating material 4 for holding the parts together.

The driving element 1 forms the rim of the wheel and constitutes a friction surface which engages the mechanism to be driven. The rim is preferably made out of cork though other suitable material may be used. Cork is light, inexpensive, lends itself readily to manufacturing processes and forms an excellent gripping surface for wheels used with small motors. The rim is made from a circular blank by punching a substantially rectangular opening 5 therein, said opening being adapted to receive the metal sleeve 2. The rim may, in some cases, be made of metal and other materials, and it may have teeth cut in it if desired.

The sleeve 2 is shaped to fit the rectangular opening 5 in the rim 1, the sleeve being made slightly larger than said opening so that when forced into the opening it is automatically held in position. This sleeve serves to protect the cork driving element in a manner which will be hereinafter described.

The metal bushing 3 is made of a size and shape suitable for fitting onto the shaft of the driving member with which the wheel is to be used. In the embodiment shown the bushing has a head provided with an opening for a set screw for fastening the wheel to the driving shaft.

The rim 1, the sleeve 2 and the bushing 3 are held together by a body of molded material 4 preferably bakelite. Bakelite is an insulating material made from phenolic condensation products. It has the property of hardening under the action of heat and pressure without shrinking in volume. It is also a good insulating material, it resists the action of acids, and does not soften under the action of heat. It securely holds the elements 1, 2 and 3 together and will not loosen under the stress of practical conditions. It also has a certain amount of resilience so that it absorbs shocks and reduces the noise caused by vibrations and shocks to a minimum. Other suitable materials capable of being molded into shape and hardened may be used, as for example condensite.

It has been found that when bakelite is molded about cork and baked and hardened, it penetrates the cork if the metal sleeve 2 is not used and seriously interferes with the qualities of the cork as a driving element. The cork becomes hard, non-resilient and loses its gripping qualities. Also the cork is distorted and put under a bursting strain which materially weakens it. By placing a metal bushing in the opening in the cork rim and thereafter molding the bakelite around the parts, a rugged wheel is produced in which the cork has the requisite driving qualities and is not placed under internal stresses.

The wheel may be readily and inexpensively manufactured and when completed forms a very compact, neat and efficient device. It is particularly adapted for use in driving sewing machines where the drive wheel engages the rim of the balance wheel of the machine.

It is to be understood that the structure shown is for purposes of illustration only and that other structures may be devised which come within the spirit and scope of the appended claims.

What I claim and desire to secure by United States Letters Patent is:—

1. The method of making a drive wheel which consists in arranging a hub within and in spaced relation to a driving rim, filling the space between said parts with a plastic material and hardening said material to hold the parts together.

2. The method of making a drive wheel which consists in arranging a hub within a driving rim, filling the space between said parts with a phenolic condensation product and hardening said material under the action of heat and pressure.

3. The method of making a drive wheel which consists in arranging a hub within a driving rim, filling the space between said parts with bakelite compound and hardening said material under the action of heat and pressure.

4. The method of making a drive wheel which consists in arranging a hub within and in spaced relation to a driving rim, filling the space between said parts with a plastic material and hardening said material under the action of heat and pressure to hold the parts together.

5. The method of making a drive wheel which consists in arranging a hub within and in spaced relation to a driving rim and filling the space between said parts with a molded material to hold the parts together.

6. A drive wheel having a hub and a driving rim, and a body of material molded to said parts to entirely support said rim and hold the parts together.

7. A drive wheel having a hub and a driving rim, and a body composed of phenolic condensation products to hold said parts together.

8. A drive wheel having a hub and a driving rim, and a body of bakelite to hold said parts together.

9. A drive wheel comprising a hub, a driving rim of cork or the like, a metal sleeve surrounding the inner periphery of the cork rim, and a body of material molded about said parts to hold them together.

10. A drive wheel comprising a hub, a driving rim of cork or the like, a metal sleeve surrounding the inner periphery of the cork rim, and a body composed of phenolic condensation material molded about said parts to hold them together.

11. A drive wheel comprising a hub, a driving rim of cork or the like, a metal sleeve surrounding the inner periphery of the cork rim and a body of bakelite molded about said parts and hardened for holding them together.

12. A driving wheel having a driving rim and a body portion formed of material molded about the inner portion of said rim.

In witness whereof, I have hereunto subscribed my name in the presence of two witnesses.

FREDERICK DIEHL.

Witnesses:
C. H. MORRELL,
H. L. ZABRISKIE.